(12) United States Patent
Brown et al.

(10) Patent No.: US 11,858,849 B2
(45) Date of Patent: *Jan. 2, 2024

(54) STRUCTURAL ASSEMBLY BOARD AND METHOD OF MANUFACTURING SAME

(71) Applicant: MGO SYSTEMS LTD., Calgary (CA)

(72) Inventors: Doug Brown, Calgary (CA); Todd McKay, Lethbridge (CA)

(73) Assignee: MGO SYSTEMS LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,307

(22) Filed: Oct. 21, 2021

(65) Prior Publication Data

US 2022/0041507 A1    Feb. 10, 2022

Related U.S. Application Data

(63) Continuation of application No. 16/676,235, filed on Nov. 6, 2019, now Pat. No. 11,180,416.

(60) Provisional application No. 62/756,312, filed on Nov. 6, 2018.

(51) Int. Cl.
| | |
|---|---|
| *C04B 28/10* | (2006.01) |
| *C04B 22/12* | (2006.01) |
| *C04B 22/16* | (2006.01) |
| *C04B 16/06* | (2006.01) |
| *C04B 18/08* | (2006.01) |
| *C04B 14/18* | (2006.01) |
| *C04B 18/24* | (2006.01) |
| *C04B 111/00* | (2006.01) |

(52) U.S. Cl.
CPC ............ *C04B 28/105* (2013.01); *C04B 14/18* (2013.01); *C04B 16/0633* (2013.01); *C04B 18/08* (2013.01); *C04B 18/248* (2013.01); *C04B 22/124* (2013.01); *C04B 22/16* (2013.01); *C04B 22/165* (2013.01); *C04B 2111/00612* (2013.01)

(58) Field of Classification Search
CPC ......... C04B 14/18; C04B 16/06; C04B 18/08; C04B 18/24; C04B 22/12; C04B 22/16; C04B 28/10
See application file for complete search history.

(56) References Cited

U.S. PATENT DOCUMENTS

| | | | |
|---|---|---|---|
| 2,434,451 A | 1/1948 | Austin | |
| 10,167,231 B1 | 1/2019 | Wambaugh | |
| 11,180,416 B2 * | 11/2021 | Brown | ................. C04B 18/248 |
| 2007/0017418 A1 * | 1/2007 | Dennis | ............... C04B 40/0042 |
| | | | 106/688 |
| 2013/0256578 A1 * | 10/2013 | Li | ............................. E04B 1/76 |
| | | | 252/62 |
| 2017/0283324 A1 * | 10/2017 | Cui | ......................... B32B 13/14 |

FOREIGN PATENT DOCUMENTS

| | | | | |
|---|---|---|---|---|
| KR | 10-2014-0066086 A * | 5/2014 | ............. | C04B 28/10 |
| WO | WO-2008063904 A2 * | 5/2008 | ............. | C04B 28/32 |

* cited by examiner

*Primary Examiner* — Anthony J Green
(74) *Attorney, Agent, or Firm* — NORTON ROSE FULBRIGHT CANADA LLP

(57) ABSTRACT

A composition for use in making a structural assembly board, a structural assembly made from the composition, and a method of making the structural assembly board is provided. The composition includes magnesium oxide having purity of 94-98 wt %; magnesium chloride; fly ash; and water. The magnesium oxide has at least two different particles sizes. The composition and method of making the structural assembly board promote formation of $5MgO \cdot MgCl_2 \cdot 8H_2O$ to improve structural qualities of the structural assembly board.

20 Claims, 2 Drawing Sheets

STRUCTURAL ASSEMBLY BOARD AND METHOD OF MANUFACTURING SAME

CROSS REFERENCE TO RELATED APPLICATION AND CLAIM OF PRIORITY

This application is a continuation of U.S. patent application Ser. No. 16/676,235, filed Nov. 6, 2019, issued as U.S. Pat. No. 11,180,416 on Nov. 23, 2021, which claims all benefit including priority to U.S. Patent Application No. 62/756,312, filed Nov. 6, 2018 entitled, "STRUCTURAL ASSEMBLY BOARD AND METHOD OF MANUFACTURING SAME". The entire contents of each of these applications is hereby incorporated by reference in their entireties.

TECHNICAL FIELD

This relates to construction materials, and in particular, to structural assembly boards.

BACKGROUND

Magnesium oxide (MgO) cements are used in the construction industry as building material. Cement is then be produced by the exothermic reaction between MgO and $MgCl_2/H_2O$ to produce a cementitious material.

MgO cements can be used as a construction material, for example in construction boards, to provide a structural insulated panel that is flame retardant, mold resistant, and recyclable.

SUMMARY

In an embodiment, a structural assembly board may be made from a composition of high-purity MgO having multiple particle sizes, the composition providing properties to reduce manufacturing time, maximize structural properties of the board such as strength, and minimize corrosivity of free chloride ions.

According to an aspect of the invention, a composition for use in making a structural assembly board is provided.

In an embodiment, the composition may comprise Magnesium oxide (MgO) having purity of 94-98 wt %; Magnesium chloride ($MgCl_2$); and Water, wherein the MgO has at least two different particles sizes.

In an embodiment, the molar ratio of $MgO:MgCl_2:H_2O$ is 5-9:1:10-20.

In an embodiment, the molar ratio of $MgO:MgCl_2:H_2O$ is about 5.5:1:12.5

In an embodiment, the MgO has a purity of greater than 96.5 wt % MgO.

In an embodiment, the composition further comprises KFO105.

In an embodiment, the composition further comprising fiber. The fiber may be at least one of basalt, polypropylene, hemp, and/or flax.

In an embodiment, the composition further comprises pigment.

In an embodiment, the composition further comprising fly ash. The fly ash may be type F fly ash.

In an embodiment, the composition further comprising expanded perlite. The perlite may have a particle size of 0.5 mm-2 mm. The perlite may contain either/both coarse or fine particles.

In an embodiment, the composition further comprises at least one of carboxylic functionalized amphiphilic molecules, phosphonic functionalized amphiphilic molecules, and/or polymers.

In an embodiment, the composition further comprises $NaH_2PO_4$, $KH_2PO_4$, $H_3PO_4$ or sodium silicate.

According to another aspect of the invention, a method of manufacturing a structural assembly board is provided.

In an embodiment, the method comprises dissolving magnesium chloride, e.g magnesium chloride hexahydrate, in water to form a brine solution; dissolving MgO, having a purity of 94-98 wt % MgO, endothermically in the solution to form a cement mixture, the MgO having at least two different particles sizes; mixing the cement mixture; and curing the cement mixture in a mould.

In another embodiment, the water is about 40° C. before magnesium chloride is dissolved into the water.

In another embodiment, the molar ratio of $MgCl_2:H_2O$ is 1:12-13.

In another embodiment, the method further comprises adding aggregate and reinforcing fibers to the solution.

In another embodiment, the method further comprises cooling the solution to a temperature less than or equal to 24° C. before dissolving MgO in the solution.

In another embodiment, the method further comprises cooling the solution to a temperature of about 14° C. to 24° C. when the MgO is dissolved in the solution.

In another embodiment, the method further comprises mixing the cement mixture for less than 1.5 hours.

In another embodiment, the MgO dissolved in the solution has a purity of greater than 96.5%.

In another embodiment, the MgO has at least two different particles sizes.

In another embodiment, the MgO has a first particle size having a surface area of 30 $m^2/g$ and a second particle size of 70 $m^2/g$.

In another embodiment, the method further comprises adding at least one of carboxylic functionalized amphiphilic molecules, phosphonic functionalized amphiphilic molecules, and/or polymers.

In another embodiment, the method further comprises $NaH_2PO_4$, $KH_2PO_4$, $H_3PO_4$ or sodium silicate.

In another embodiment, the method further comprises coating the board in a hydrophobic film.

In another embodiment, the cement mixture is cured with at least one conditions selected from 50-90% humidity, 30-60° C., 20-30° C., and curing for at least 24 hours.

According to another aspect, a structural assembly board made from the composition of the present invention is provided.

In an embodiment, the structural assembly board further comprises $5MgO \cdot MgCl_2 \cdot 8H_2O$ (Phase-5 crystal structures).

In another embodiment, the structural assembly board has Phase-5 crystal structures comprising 90% of the MgO.

DETAILED DESCRIPTION

Figure 1:
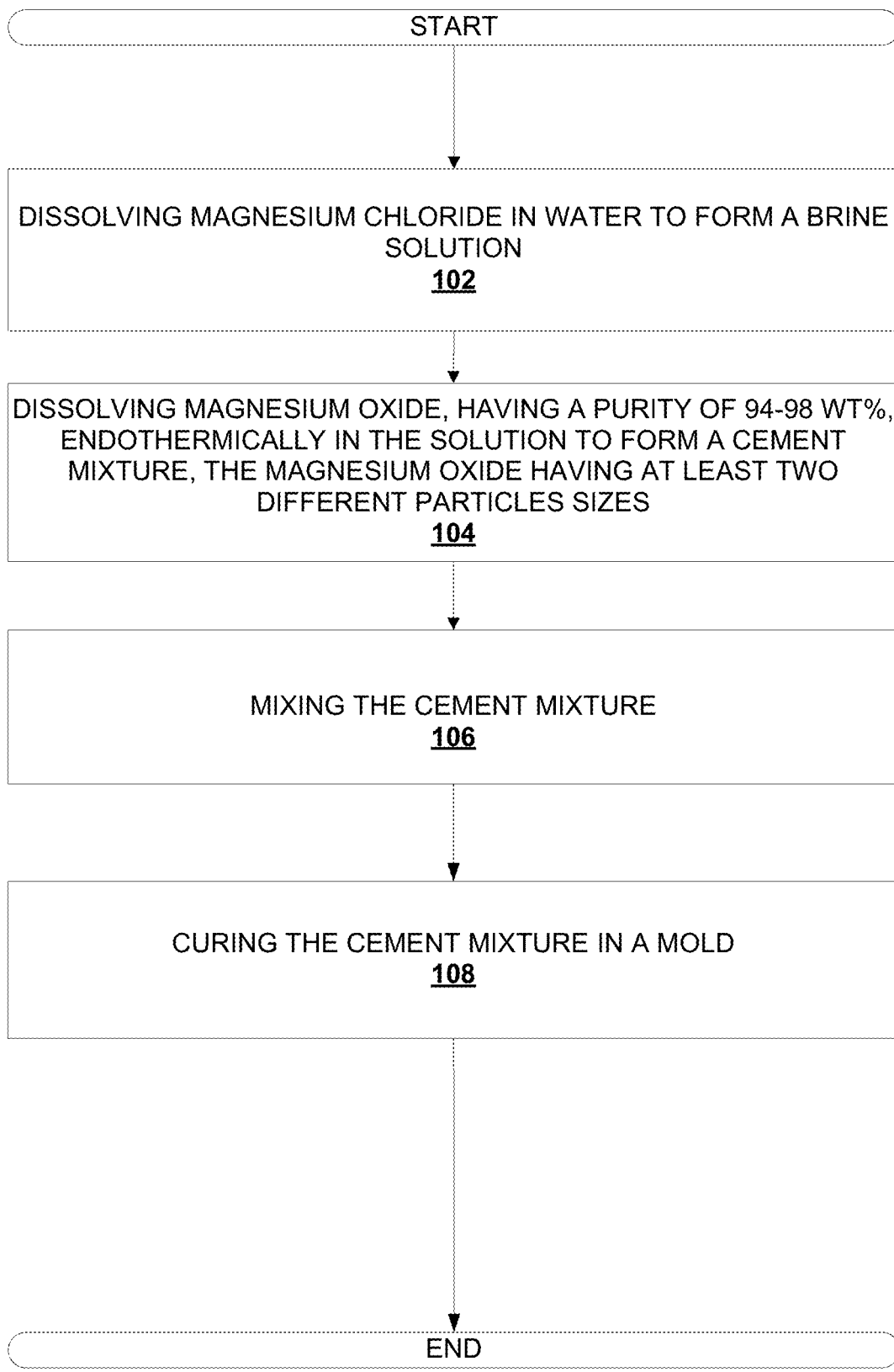
FIG. 1 depicts a method for making a structural assembly board according to some embodiments.

Structural assembly boards comprising magnesium oxide cement may be provided with improved properties, such as improved flexure strength and reduced corrosivity, by the formation of crystal structures such as $5MgO \cdot MgCl_2 \cdot 8H_2O$ (Phase-5 crystal structures). Increasing the amount of MgO converted into Phase-5 crystal structures, from an initial cement mixture, may improve the properties of a structural assembly board made from MgO cement. In contrast, MgO cement is typically made from 80-85% pure MgO, $MgCl_2$, and water, see e.g. U.S. Pat. No. 7,998,547B2, which may result in weaker structural properties in comparison to the present invention.

Maximizing Phase-5 crystal structure in a structural assembly board made from MgO cement may be achieved using high purity magnesium oxide with multiple particle sizes. The use of high-purity MgO with multiple particles sizes may improve the properties of the structural assembly board in comparison of existing MgO boards, for example, by increasing the strength of the board, minimizing corrosivity of the board by reducing free chloride ions, and reducing manufacturing time by reducing the number of steps required to make the structural assembly board.

In an embodiment, a composition to make a structural assembly board comprises magnesium oxide having purity of 94-98 wt %, magnesium chloride ($MgCl_2$), and water. In this disclosure, purity of MgO should be understood as the content of MgO in the magnesium oxide source material, e.g. a 94-98 wt % purity of MgO will have 94-98 wt % MgO with the remainder comprising oxides of at least one of calcium, iron, aluminium, and/or silicon. In a further embodiment, the purity of the magnesium oxide may be greater than 96.5 wt % MgO. The magnesium oxide has at least two different range of particles sizes, for example, MgO(30) and MgO(40) from Baymag™. MgO(30) may have a particle distribution where 90 vol % is less than 65 µm. MgO(40) may have a particle distribution where 90 vol % is less than about 36 µm. In an embodiment, the MgO will comprise a first particle size of about 30 $m^2/g$ and a second particle size of about 70 $m^2/g$. During the reaction between MgO, $MgCl_2$ and water, the desirable product of the reaction is a Phase-5 Crystal Structure; however, a competing reaction may convert MgO and water into magnesium hydroxide which may cause cured cement to become brittle. Smaller MgO particles, e.g. 30 $m^2/g$, are more reactive than larger MgO particles, yet if reacted alone with $MgCl_2$ and water will promote formation of magnesium hydroxide. Larger MgO particles, e.g. 70 $m^2/g$, if reacted alone with $MgCl_2$ and water, are less reactive than a small particle and tend to favour Phase-5 Crystal structure formation; however, the center of the particle may become non-reactive. A combination of small and larger particle sizes may promote a reaction rate that favours the formation of Phase-5 Crystal Structure. Typical mixtures of large to small particles are 3:1 by weight and demonstrate substantial Phase-5 crystal growth.

Traditional MgO cements, and more particularly boards made from the cement, have a propensity for chloride migration in humid (e.g. >90% humidity) or flood conditions due to the porosity of the boards and their inherent water unstable $MgO:MgCl_2$ structures. Unbound chloride ions have the ability to permeate the porous structure of the MgO concrete board and corrode lumber and steel. Accordingly, the usage of traditional MgO cement board is generally limited to use with stainless steel fasteners. The problem associated with free chloride ions may be addressed by binding those ions to prevent their migration.

In an embodiment, the $MgCl_2$ is magnesium chloride hexahydrate. In another embodiment, the molar ratio of $MgO:MgCl_2:H_2O$ of the composition to make a structural assembly board is 5-9:1:10-20. In a further embodiment, the molar ratio of $MgO:MgCl_2:H_2O$ is about 5.5:1:12.5. In combination with high purity MgO (e.g. 94-98 wt %), a molar ratio of 5-9:1:10-20 $MgO:MgCl_2:H_2O$ may allow greater than 80% MgO in the composition to form Phase-5 Crystal Structure in the resulting cement. By binding chloride ions in the Phase-5 Crystal Structure, the amount of corrosivity causing free chloride ions is reduced in MgO structural assembly boards in comparison to boards made from MgO having lower Phase-5 Crystal Structure content.

Free chloride ion migration may also be reduced by enhancing water resistance of a structural assembly board. In an embodiment, the composition for making a structural assembly board includes at least one of carboxylic functionalized amphiphilic molecules, phosphonic functionalized amphiphilic molecules, and/or polymers may be added to a composition according to the present invention. Incorporation of carboxylic or phosphonic functionalized amphiphilic small molecules or polymers in the composition to make a structural board has shown an enhancement in water resistance in the resulting board. It is postulated that the acidic anchoring group bond covalently to the metal oxychloride nanoporous structure and create a hydrophobic coating. In a further embodiment, the composition includes at least one of $NaH_2PO_4$, $KH_2PO_4$, $H_3PO_4$, and/or sodium silicate to promote water resistance of the cement formed from the composition.

In another embodiment, cellulosic fibers with polyol functionality may be added to the composition to make a structural assembly board. Cellulosic fibers with polyol functionality have also demonstrated enhanced water resistance. In a further embodiment, a structural assembly board may be coated with a thin superhydrophobic film to make the board impermeable to water.

Traditional MgO cement boards are generally reinforced by reinforcing mesh, e.g. fiberglass mesh, to provide a supporting structure for the cement board so that it does not fracture when flexed. In an embodiment of the present invention, flexural strength of an MgO structural assembly board may be improved by adding reinforcing fiber to the composition for making a structural assembly board. In an further embodiment, the fiber may be at least one of basalt, polypropylene, hemp, and/or flax. In another embodiment, aggregate, for example fly ash (type F) and/or perlite, may be added to lower the density of the composition and increase flexural strength of a structural assembly board made from the composition.

Two particle sizes of perlite have been investigated as part of the composition for making a structural assembly board. In an embodiment, the two sizes of perlite may be added as 10-15% wt of the composition for making a structural assembly board. For example, the particle size may be 0.5 mm-2 mm, and the density of perlite may be Perlite C (coarse) and Perlite F (fine). Alternative perlite particle sizes and densities may be used in the composition.

In another embodiment, the composition for making a structural assembly board may further comprise a defoamer, e.g. the commercial defoamer KFO105, to destabilize foam created from the composition which promote reactivity of MgO and homogeneous mixing of the composition.

In another embodiment, the composition for making a structural assembly board may further comprise pigment of any colour.

Exemplary compositions for use in making a structural assembly board are shown in Examples 1-5. Each of the exemplary compositions also contained either $NaH_2PO_4$ or $H_3PO_4$ at <3 wt % of total MgO weight, and one of carboxylic or phosphonic functionalized amphiphilic small molecules or polymers at <5 wt % of total MgO content.

Example 1 (ID #9)

| Component | Mass (kg) | Mol Ratio (MgO:MgCl$_2$:H$_2$O) |
|---|---|---|
| MgO (30/40) | 2.5-3.0 | 5.5 |
| MgCl$_2$•6H$_2$O | 2.3-2.7 | 1.0 |
| H$_2$O | 1.2-1.6 | 12.3 |
| KFO105 | 0.07 | |
| Flax | 0.2-0.6 | |
| Pigment | 0.02 | |
| Fly Ash | 0.8-1.2 | |

Example 2 (ID #10)

| Component | Mass (kg) | Mol Ratio (MgO:MgCl$_2$:H$_2$O) |
|---|---|---|
| MgO (30/40) | 2.5-2.9 | 5.4 |
| MgCl$_2$•6H$_2$O | 2.3-2.7 | 1.0 |
| H$_2$O | 1.2-1.6 | 12.3 |
| KFO105 | 0.07 | |
| Flax | 0.2-0.6 | |
| Pigment | 0.02 | |
| Fly Ash | 0.8-1.2 | |

Example 3 (ID #17)

| Component | Mass (kg) | Mol Ratio (MgO:MgCl$_2$:H$_2$O) |
|---|---|---|
| MgO (30/40) | 2.5-2.9 | 5.4 |
| MgCl$_2$•6H$_2$O | 2.3-2.7 | 1.0 |
| H$_2$O | 1.2-1.6 | 12.3 |
| KFO105 | 0.07 | |
| Perlite F | 0.5-0.9 | |
| Flax | 0.2-0.4 | |
| Pigment | 0.02 | |
| Fly Ash | 0.3-0.6 | |

Example 4 (ID #18)

| Component | Mass (kg) | Mol Ratio (MgO:MgCl$_2$:H$_2$O) |
|---|---|---|
| MgO (30/40) | 2.0-2.3 | 5.5 |
| MgCl$_2$•6H$_2$O | 1.8-2.2 | 1.0 |
| H$_2$O | 1.1-1.4 | 13.3 |
| KFO105 | 0.07 | |
| Perlite C | 0.1-0.3 | |
| Perlite F | 0.3-0.5 | |
| Flax | 0.3-0.5 | |
| Fly Ash | 0.3-0.5 | |

Example 5 (ID #27)

| Component | Mass (kg) | Mol Ratio (MgO:MgCl$_2$:H$_2$O) |
|---|---|---|
| MgO (30/40) | 1.8-2.2 | 5.61 |
| MgCl$_2$•6H$_2$O | 1.6-2.0 | 1.00 |
| H$_2$O | 1.0-1.3 | 13.21 |
| KFO105 | 0.07 | |
| Perlite C | 0.1-0.2 | |
| Perlite F | 0.5-0.7 | |
| Flax | 0.1-0.2 | |
| Fly Ash | 0.7-0.9 | |
| Polypropylene Fiber | 0.01 | |

Controlling formation of Phase-5 Crystal Structure when making a structural assembly board is important to provide the board with improved properties, e.g. flexural strength.

With reference to the method flow chart of FIG. 1, some embodiments may provide for a method of manufacturing a structural assembly board.

At 102, a brine solution may be produced by dissolving magnesium chloride, e.g. magnesium chloride hexahydrate (MgCl$_2$.6H$_2$O), in a warmed solution of water (e.g. ~40° C.). In an embodiment, a total ratio of 1:12-13 MgCl$_2$:H$_2$O may be maintained in the brine solution. The brine solution may then be cooled (e.g. to −14-24° C.) and checked for absolute clarity before addition of remaining components.

At 104, high purity MgO having a purity of 94-98 wt % MgO is endothermically dissolved in the brine solution to form a cement mixture. In an embodiment, the purity of MgO is greater than or equal to 96.5 wt % MgO. The magnesium oxide may have at least two different particles sizes, for example, a first particle size having a surface areas equal to 30 m$^2$/g and a second particle size having a surface area equal to 70 m$^2$/g. The mixture of the two particle sizes imbues an ability to control the reaction rate of the initial crystallization of the cement. Smaller particles react more quickly than larger particles, however, the use of small particles alone can cause rapid curing, formation of magnesium hydroxide, and weakening issues in the cement product if not controlled precisely. Larger particles are less reactive and tend to convert MgO into stronger crystalline structures; however, the center of the particle may become non-reactive leaving gaps in said crystalline structures. A mixture of at least two particle sizes may optimize Phase-5 crystal formation.

In an embodiment, aggregate and/or reinforcing fibers, may be added to augment the strength of the concrete. The aggregate (e.g. perlite and fly ash) and/or reinforcing fibers (e.g. basalt, polypropylene, hemp and/or flax) may be added by monitoring the temperature of cement mixture to determine when aggregate and reinforcing fibers is added. The endothermic dissolution of MgO into the brine solution is preferably accomplished at low temperature, e.g. 14° C., to avoid the formation of the higher activation energy product Mg(OH)$_2$. The aggregate and reinforcing fibers serve to augment the strength of structural assembly board such that the board will may not require supplementary structural support (e.g. fiberglass mesh). Accordingly, in an embodiment, a structural assembly board may be free of supplementary structural support such as fiberglass mesh.

At 106, the cement mixture is mixed to provide a homogenous mixture. In an embodiment, a high shear or low shear mixing process provides a workable homogeneous after approximately 15 minute of mixing time. In an embodiment, mixing should not exceed 1.5 hours to avoid crystallization in turbulent conditions.

At 108, the cement mixture is cured. In an embodiment, the cement mixture is moulded and then vibrated to remove trapped air before curing. In another embodiment, curing may occur under high humidity (50-90%) and temperature (30-50° C.) conditions to improve strength of the cement. The board may then be demoulded after 24 hours, however when temperature is increase above 50° C. the board may be demoulded faster than 24 hours. In another embodiment, a cured board may then be put in a less humid environment (e.g. less than 50% humidity) to dry and then be cut to specification.

In an embodiment, a defoamer, e.g. KFO105, and/or pigment, may be added to the brine solution or cement mixture.

According to some embodiments, a structural assembly board may be made from a composition for use in making a structural assembly board described above. The structural assembly board may have a Phase-5 crystal structure composition comprising more than 80% of the MgO in the composition. In another embodiment, the Phase 5 crystal structure composition of the board comprises greater than 90% of the MgO in the composition.

Figure 2:
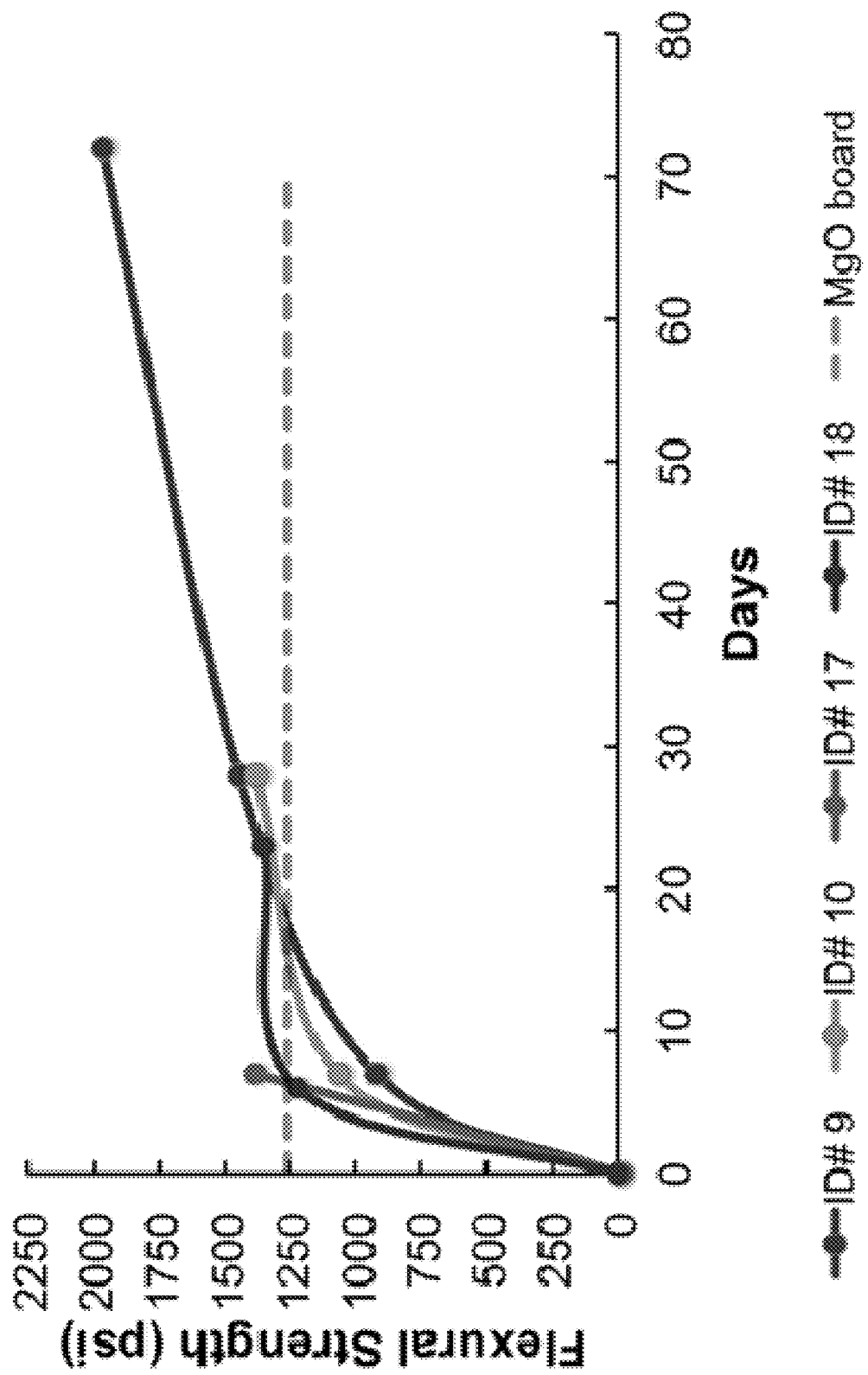
FIG. 2 is a graphical illustration of flexural strength according to embodiments of the invention.

Structural properties of MgO concrete (e.g. flexural strength) increase over the time as long as the concrete is not exposed to harsh environments. However, MgO concrete made according to embodiments of the above method may be cured to a commercially acceptable flexural strength within 7 days. Further, as shown in FIG. 2, the flexural strength of commercially available MgO board, which has been cured for at least 1 year, is compared to the structural assembly boards produced from the compositions of Examples 1-4, over a measured period of curing time in air at room temperature. As shown in FIG. 2, the structural assembly board made from the composition of Examples 1-4, exceed the flexural strength of MgO board after at least 30 days.

Screw withdrawal tests (ASTM D1037) shown in Table 1, also illustrate that structural assembly boards made according to the invention may yield a product that stronger than commercially available MgO board in certain situations.

TABLE 1

Selected top performance metrics from prototype boards.

| | Curing Time (days) | Weight (4x8 ft × ½ inch) | Screw Withdrawal (lbf) | Flexural Strength (psi) |
|---|---|---|---|---|
| MgO board | >365 | 86 | 308 | 1267 |
| ID#9 | 72 | 115 | 450 | 1970 |
| ID#18 | 6 | 93 | 354 | 1220 |

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A composition for use in making magnesium oxide cement comprising:
    Magnesium oxide (MgO) comprising a first and second plurality of MgO particles, wherein the first plurality of particles has a surface area of at least 70 $m^2/g$, and wherein the second plurality of particles has a surface area at least 40 $m^2/g$ smaller than the first plurality of particles;
    Magnesium chloride ($MgCl_2$);
    Water, and
    fly ash,
    wherein the molar ratio of $MgO:MgCl_2:H_2O$ is 5-9:1:10-20.

2. The composition of claim 1, wherein the molar ratio of $MgCl_2:H_2O$ is about 1:12-13.

3. The composition of claim 1, wherein the MgO comprises greater than 96.5 wt % MgO.

4. The composition of claim 1, further comprising reinforcing fiber.

5. The composition of claim 4, wherein the reinforcing fiber is at least one of basalt, polypropylene, hemp, and/or flax.

6. The composition of claim 1, further comprising at least one of carboxylic functionalized amphiphilic molecules, phosphonic functionalized amphiphilic molecules, and/or polymers.

7. The composition of claim 1, further comprising $NaH_2PO_4$, $KH_2PO_4$, $H_3PO_4$ or sodium silicate.

8. The composition of claim 1, comprising aggregate, reinforcing fiber, and at least one of $NaH_2PO_4$, $KH_2PO_4$, $H_3PO_4$ or sodium silicate.

9. The composition of claim 1, wherein the MgO has a purity of 94-98 wt % MgO.

10. The composition of claim 1, wherein the first plurality of MgO particles has a surface area of approximately 70 $m^2/g$ and the second plurality of MgO particles has a surface area of approximately 30 $m^2/g$.

11. The composition of claim 1, wherein a ratio of the first plurality of MgO particles to the second plurality of MgO particles is approximately 3:1.

12. A structural assembly board made from the composition of claim 1.

13. An magnesium oxide cement made from the composition of claim 1.

14. A method of manufacturing a magnesium oxide cement, the method comprising:
    dissolving magnesium chloride in water to form a brine solution;
    dissolving MgO endothermically in the solution to form a cement mixture;
    adding aggregate to the solution;
    mixing the cement mixture; and
    curing the cement mixture in a mould,
    wherein the molar ratio of $MgO:MgCl_2:H_2O$ is 5-9:1:10-20;
    wherein the MgO comprises a first and second plurality of MgO particles, wherein the first plurality of particles has a surface area of at least 70 $m^2/g$, and wherein the second plurality of particles has a surface area at least 40 m²/g lower than the first plurality of particles.

15. The method of claim 14, wherein the molar ratio of $MgCl_2:H_2O$ is 1:12-13.

16. The method of claim 14, comprising adding reinforcing fibers to the solution.

17. The method of claim 14, further comprising cooling the solution to a temperature less than or equal to 24° C. before dissolving MgO in the solution.

18. The method of claim 14, wherein the first plurality of MgO particles has a surface area of approximately 70 m²/g and the second plurality of MgO particles has a surface area of approximately 30 m²/g.

19. The method of claim 14, wherein the cement mixture is cured with at least one conditions selected from 50-90% humidity, 30-60° C., 20-30° C., and a curing time of at least 24 hours.

20. The method of claim 14, wherein the MgO has a purity of 94-98 wt % MgO.

* * * * *